Oct. 21, 1930. B. R. KENWORTHY 1,779,404
LIGHT BEAM TESTING DEVICE
Filed Sept. 26, 1928
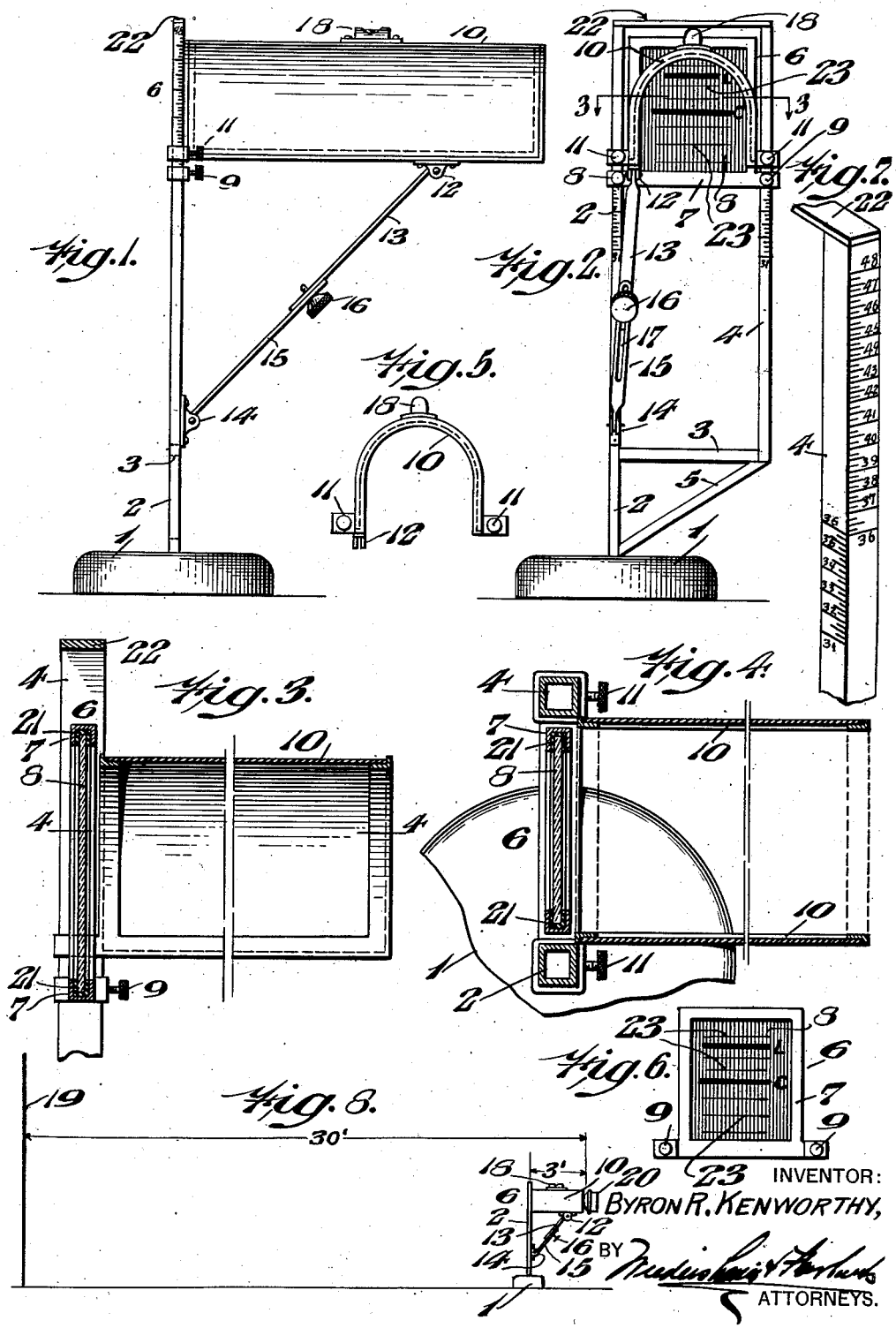

Patented Oct. 21, 1930

1,779,404

UNITED STATES PATENT OFFICE

BYRON R. KENWORTHY, OF PHILADELPHIA, PENNSYLVANIA

LIGHT-BEAM-TESTING DEVICE

Application filed September 26, 1928. Serial No. 308,518.

This invention stated in general terms relates to a beam testing device particularly adapted for a headlight tester for automobiles and has more especial relation to an adjustable device which may be used in a garage or may be used out of doors.

As practiced at the present time, it is customary to drive into a garage with an automobile and halt or stop the same within approximately 30 feet of the end wall of the garage where it is desired to test the headlight beam as is required by law. Obviously this necessitates a great deal of waste space in the garage and one of the objects of the present invention may be said to reside in the provision of a device whereby this waste space may be saved and an automobile driven directly up to the device of the invention so that the headlights or lamps of an automobile may be tested within the space of say approximately three feet.

A further object is to provide a device so constructed and arranged as to operate to determine with mathematical exactness whether the setting of an auto headlight is so made as to project a beam which will not exceed in height the limits set by law at the specified distance mentioned by law and to enable such determination to be made within a space of 36" in front of the headlight being tested instead of requiring the use of the space involved by testing the height of projected beam at the limit fixed by regulation.

A further object of the present invention is to provide a device of the character stated which is portable; which is adjustable, and which will permit of the testing of automobile headlight beams within a very short space of territory, either within or without a garage.

A still further object of the present invention is to provide a simple, efficient, comparatively inexpensive, and portable device which is of light structure, which when not in use may be set to one side and thus provide in the usual busy garage additional room or space.

Other and further objects not at this time appearing will be hereinafter referred to.

The invention consists of the novel construction hereinafter described and finally claimed.

The nature, characteristic features and scope of the invention will be more fully understood from the following description taken in connection with the accompanying drawings forming part hereof, and in which:

Figure 1 is a view in side elevation of a device embodying the invention.

Figure 2 is an end view thereof.

Figure 3 is a view in section taken upon the line 3—3 of Figure 2.

Figure 4 is a sectional plan view taken upon the line 4—4 of Figure 3.

Figure 5 is a fragmentary view illustrating a detail of construction hereinafter referred to.

Figure 6 is a view hereinafter referred to.

Figure 7 is a view in perspective of the standard shown at the left hand side of Figure 1.

Figure 8 is a view of the device of the invention and showing the application thereto.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings, the reference numeral 1 designates a base which may be of circular or other configuration. Rising therefrom is a standard 2, preferably hollow, and which may be of rectangular cross section, as shown in Figure 2, although obviously the standard may be of circular or other cross section. Extended laterally from the standard 2 is a horizontally disposed cross piece 3 rising from which is a second standard 4. Connecting the standard 2 adjacent the base 1 and the meeting ends of the cross piece 3 and standard 4 is a strut 5. Each of the standards is provided with graduations, on the front and one side, as is clearly illustrated in Fig. 7, so that the target 6, as is best seen in Fig. 6, and the hood 10, as best seen in Fig. 5, may be raised and lowered with respect to the graduations aforesaid, whereby proper heights may be discerned in the securing of adjustments of headlight beams as from automobile headlights. The target proper comprises a frame 7 provided with a ground, or ribbed glass or other translucent material, as glass 8, which frame is arranged between the standards 2 and 4 and is adjustable vertically with respect thereto by means of the thumb screws 9. Also carried by the standards 2 and 4 is a hood 10 which is of generally inverted U-shaped construction and is also adjustable vertically with respect to the standards 2 and 4 by thumb screws 11. As clearly shown in Fig. 5, the hood 10 is of inverted U-shaped cross section and is open at both ends. By having the hood positioned before the target 6 so that the top of the hood is closed, the rays of light from an automobile lamp cannot escape upwardly but are directed directly to the target. The hood 10 is best seen in Fig. 5. The outer end, or substantially the outer end of the hood 10, has pivotally connected therewith as at 12, a rod 13 and the standard 2 has pivotally connected therewith as at 14 a rod 15. These two rods 13 and 15 are adjustably connected together by means of a set screw 16, one of said rods being slotted as at 17, so that in the vertical adjustment of the hood 10 by means of the set screws 11 such vertical adjustment can be compensated for by unloosening the thumb nut 16 to permit the same to have movement through the slot 17. The upper surface of the hood 10 is provided with a conventional level 18 so that one may determine when the hood 10 is in horizontal position. It is thus apparent that the target proper is adjustable vertically with respect to the standards 2 and 4 for cooperating with the graduations of the standards 2 and 4 and that the hood is likewise vertically adjustable with respect to said standards for cooperating with the graduations of the standards 2 and 4 and with respect to said target. Thus, not only may the target be raised and lowered and the hood raised and lowered, but the hood by reason of the rods 13—15 and the thumb nut 16, taken together with the pivotal connections 12 and 14 may be adjustable horizontally with respect to the standards 2 and 4.

Referring more especially now to Figure 8, the reference numeral 19 designates the wall of a garage and the reference numeral 20 designates the headlight of an automobile. Ordinarily it is necessary that an automobile be brought to a halt or stop so that the headlights 20 are 30 feet from the wall 19 as is clearly indicated in said Fig. 8. This requires a loss of much space in the garage and is quite disadvantageous. In the present instance an automobile may be run directly up to the device of the invention so that the beams or rays of light from the headlight 20 are projected directly into the hood 10, whereupon a correct reading of light diffusion of the headlight beams may be obtained by standing in front of the target 6. In this connection, of course, it will be understood that after the proper adjustments of the target and hood with respect to scale are made, the device will indicate whether setting of headlights will comply with legal requirements and all adjustments thereafter relate to the headlight of the automobile as required by law. It is to be further understood that legal requirements as to headlights is that the beam projected thereby shall not be over a certain height above the base line at a given point in front of a headlight. The present device is fully efficient to provide an accurate measurement in this respect, even though the automobile is within three feet of the device, and setting scales arranged to make target indications show legal limits are supplied as required for any variation of legal requirements as between the regulations of different States. The hood may be of fibre or other material and the target is marked with a center line designated C and a top line L in black, horizontally disposed, and horizontal red gauge lines 23. The glass 8 of the target contained in the frame 7 is provided with a packing 21, as may be seen in Figs. 3 and 4. This is efficient to prevent glass breakage, particularly when an automobile is run directly up to the device and knocks thereagainst, or the device is subjected to rough handling. The uprights 2 and 4 are connected at their tops by a brace 22.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent, is:—

1. In a device of the character stated, comprising a single base, a pair of standards arranged in parallelism rising from the base, a light beam testing target adjustable vertically at the upper portions of the standards, and a hood having a closed top and open ends adjustable vertically on the standards and with respect to the target.

2. A device of the character stated, comprising a single base, a pair of standards arranged in parallelism rising from the base, a light beam testing target adjustable vertically at the upper portions of the standards, and a hood having a closed top and open ends of inverted U-shaped adjustable vertically on the standards and with respect to the target.

3. A device of the character stated, comprising a single base, a pair of standards arranged in parallelism rising from the base, a light beam testing target adjustable vertically at the upper portions of the standards, a hood having a closed top and open ends adjustable vertically on the standards and with respect to the target, and means including set screws carried by said hood for supporting said hood in horizontal position upon said standards.

4. A device of the character stated, comprising a single base, a pair of standards arranged in parallelism rising from the base, a light beam testing target adjustable vertically at the upper portions of the standards, a hood having a closed top and open ends adjustable vertically on the standards and with respect to the target, and means including a pair of links, one of which is slotted for set screw accommodation, adjustably arranged between said standards and hood for supporting the latter in horizontal position.

BYRON R. KENWORTHY.